O. N. SIRRINE.
VEGETABLE CUTTER.
APPLICATION FILED NOV. 16, 1914.
1,198,284.
Patented Sept. 12, 1916.
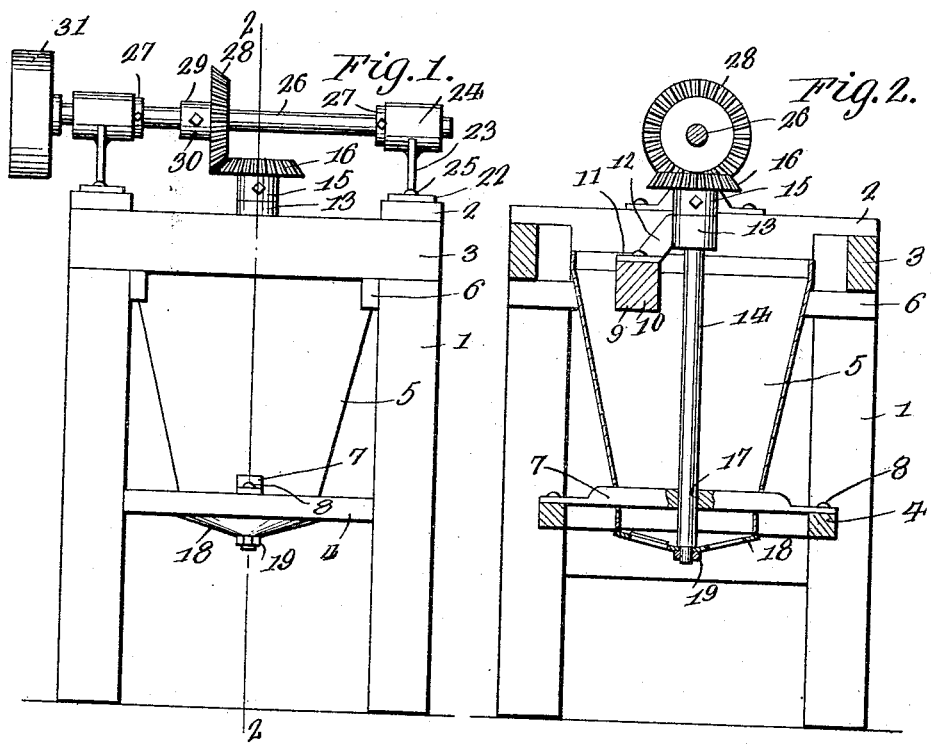
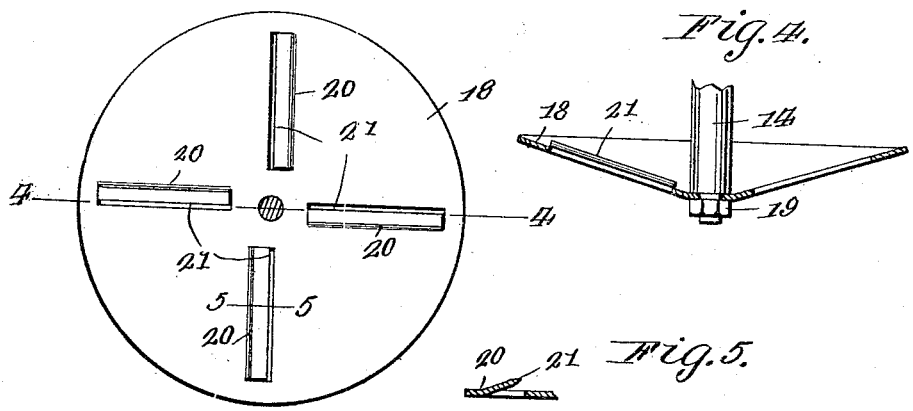
Witnesses
Guy M. Spring
Wm. H. Downing
Inventor
Orton N. Sirrine
By Richard P. Owen
Attorney

UNITED STATES PATENT OFFICE.

ORTON N. SIRRINE, OF CHANCE, MONTANA.

VEGETABLE-CUTTER.

1,198,284.　　　　Specification of Letters Patent.　　Patented Sept. 12, 1916.

Application filed November 16, 1914. Serial No. 872,447.

*To all whom it may concern:*

Be it known that I, ORTON N. SIRRINE, a citizen of the United States, residing at Chance, in the county of Carbon and State of Montana, have invented certain new and useful Improvements in Vegetable-Cutters, of which the following is a specification.

My invention relates to vegetable cutters.

The primary object of my invention resides in the provision of an improved means for cutting vegetables, especially adapted for slicing beets.

Another object of my invention resides in the provision of a novel means for mounting the cutting means, a portion of the mounting means performing three separate functions, namely, facilitating the efficient operation, the supporting of the operating means and the supporting of the hopper.

A further object of my invention resides in the provision of a novel means associated with the cutter for facilitating the operation thereof.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings: Figure 1 is a side elevational view of my invention; Fig. 2 is a vertical sectional view of the same; Fig. 3 is an enlarged top plan view of the cutting plate; Fig. 4 is a transverse sectional view taken on the line 4—4 of Fig. 3; and Fig. 5 is a transverse sectional view taken on the line 5—5 of Fig. 3 showing to advantage the construction of one of the cutters carried by the plate.

Referring more particularly to the drawings in which similar reference numerals designate like or corresponding parts throughout the different views, I provide a suitable support which in this instance consists essentially of a plurality, preferably four, supporting legs 1, the upper ends of which are suitably connected by means of transversely extending cross pieces 2 and 3, and which legs are further connected at points adjacent their lower ends with transversely arranged cross pieces 4 for bracing the same.

Disposed within the support is my improved hopper 5 which is preferably circular in cross section and has the sides intermediate the upper and lower edges tapered toward the lower edges, the hopper being supported at the upper end thereof by means of transversely extending bars 6, the latter being arranged in close engagement with the sides thereof as clearly shown in the drawings and the lower end of which hopper is supported by a transversely extending bar 7, the latter passing through oppositely disposed openings in the hopper and having the respective ends thereof reduced and secured by means of suitable fastening devices 8 to the lower cross pieces 4 at points substantially intermediate the ends thereof. In order to prevent lateral movement of the upper end of the hopper within the support, I have extended a transverse bar 9 through oppositely disposed recesses 10 in the upper edge of the hopper and rigidly secured to the respective ends of the bar 9 to the transverse bars 6.

A bracket including a base 11, an angular arm 12 extending therefrom and a horizontally disposed sleeve 13 formed integral with the end of the arm, is rigidly mounted on the upper surface of the bar 9 at a point substantially intermediate the ends thereof by suitable fastening devices. A shaft 14 is disposed within the sleeve 13 and supported therein by means of a collar 15 rigidly secured to the shaft and formed integral with a horizontally disposed beveled gear 16. The lower end of the shaft is journaled in the opening 17 positioned substantially intermediate the ends of the bar 7 and the extreme lower end of the shaft is reduced to receive my improved cutting plate 18, the latter being held in rigid connection with the shaft by means of a nut or like adjusting element 19 mounted on the reduced end of the shaft.

The cutting plate 18 in this instance is preferably conical in shape, the apex thereof being arranged in a plane parallel to the plane of the upper edge of the plate so that when the same is placed in engagement with the lower end of the shaft it will abut the same and will also be arranged in abutting relation with the nut 19 when the latter is screw threaded thereon. The plate is provided with a plurality of slits which radiate from the center thereof and the portions lying between the slits are bent upwardly as at 20 and have their longitudinal edges beveled to provide cutting edges 21 for engagement with the vegetables disposed within the hopper in a manner to be hereinafter described. Attention is particularly directed to the conical shape of the plate which tends to direct the vegetables within the hopper and supported by the plate toward the center of the plate where they will be more readily engaged by the cutting edges 21. It is also thought to be obvious that the cutters 21 may be formed separate from the plate and connected thereto in any suitable manner, however, the form shown is the preferred as it greatly reduces the cost of manufacture.

In order to rotate the shaft 14 and consequently rotate the cutting plate, I have rigidly mounted at points substantially intermediate the ends of the cross pieces 2, brackets each of which in this instance consists essentially of a base 22, a vertical arm 23 and a sleeve bearing 24, the brackets being secured to the cross pieces by means of suitable fastening devices 25. Rotatably mounted in the sleeve bearings 24 of the brackets are the respective ends of the shaft 26, the latter being prevented from having longitudinal movement within the bearings 24 by means of collars 27 rigidly mounted on the shaft and arranged in abutting relation with the inner edges of the bearings 24. A bevel gear 28 having a collar 29 formed integral therewith is adjustably mounted on the shaft by means of a set screw 30, the gear 28 having the teeth thereof arranged in mesh with the teeth of the bevel gear 16. It can be seen that when rotary motion is imparted to the shaft 25, the same will be transmitted to the shaft 14 through the medium of the bevel gears 16 and 28 and consequently rotary movement is imparted to the plate. A drive wheel 31 is rigidly mounted on the one end of the shaft 25 for facilitating the rotation of the shaft. It is thought to be obvious that the shaft could be reduced and squared to receive a suitable hand crank, not shown, in the event that it was desired to operate the device manually.

The operation of my invention is as follows: Assuming that it is desired to slice a number of beets, the same are placed within the hopper 5 and supported by the plate 18. When motion is imparted to the shaft 25 by means of a wheel or the like, not shown, operating about the drive wheel 31, the bevel gear 28 being in mesh with the bevel gear 16 carried by the vertically disposed shaft 14 rotary movement is imparted to the shaft 14 and consequently to the plate 18. As the plate is rotated the lower ends of the beets or other vegetables disposed within the hopper are sliced when engaged by the cutters 21 and pass through the opening formed by the slits into a suitable receptacle, not shown, disposed beneath the plate. During this operation the transverse bar 7 tends to hold the beets in a vertical position where they may be more readily engaged by the cutters thus greatly facilitating the operation of the machine. In addition to this because of the relation of the bar 7 to the hopper and the positioning of the bar through the hopper undue movement of the lower end of the hopper is prevented when the same is given a jar or the like.

Although I have shown and described the preferred embodiment of my invention, I desire to be understood that I am not limited to the exact details shown, however, great stress is laid upon the peculiar construction and arrangement of the cutting plate. Again attention is especially directed to the fact that the transverse bar 7 performs three separate functions and greatly reduces the number of parts required in providing a device of this character.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:

In a vegetable cutter; a truncated conical hopper open at each end, a supporting structure having connection with said hopper adjacent the upper and larger end of the latter, and a cross bar rigidly mounted on said supporting structure, journaled through said hopper at a point adjacent its lower and smaller end to preclude lateral movement; in combination with a shaft journaled through said cross bar, a bearing carried adjacent the upper end of said hopper to support said shaft, said shaped cross bar precluding lateral movement of the lower end of said shaft, a cutter on said shaft operating adjacent the lower and smaller end of said hopper, and means to drive said shaft.

In testimony whereof I affix my signature in presence of two witnesses.

ORTON N. SIRRINE.

Witnesses:
 BAXTER ZACHUNY,
 J. O. HIGHAM.